Figure 1:
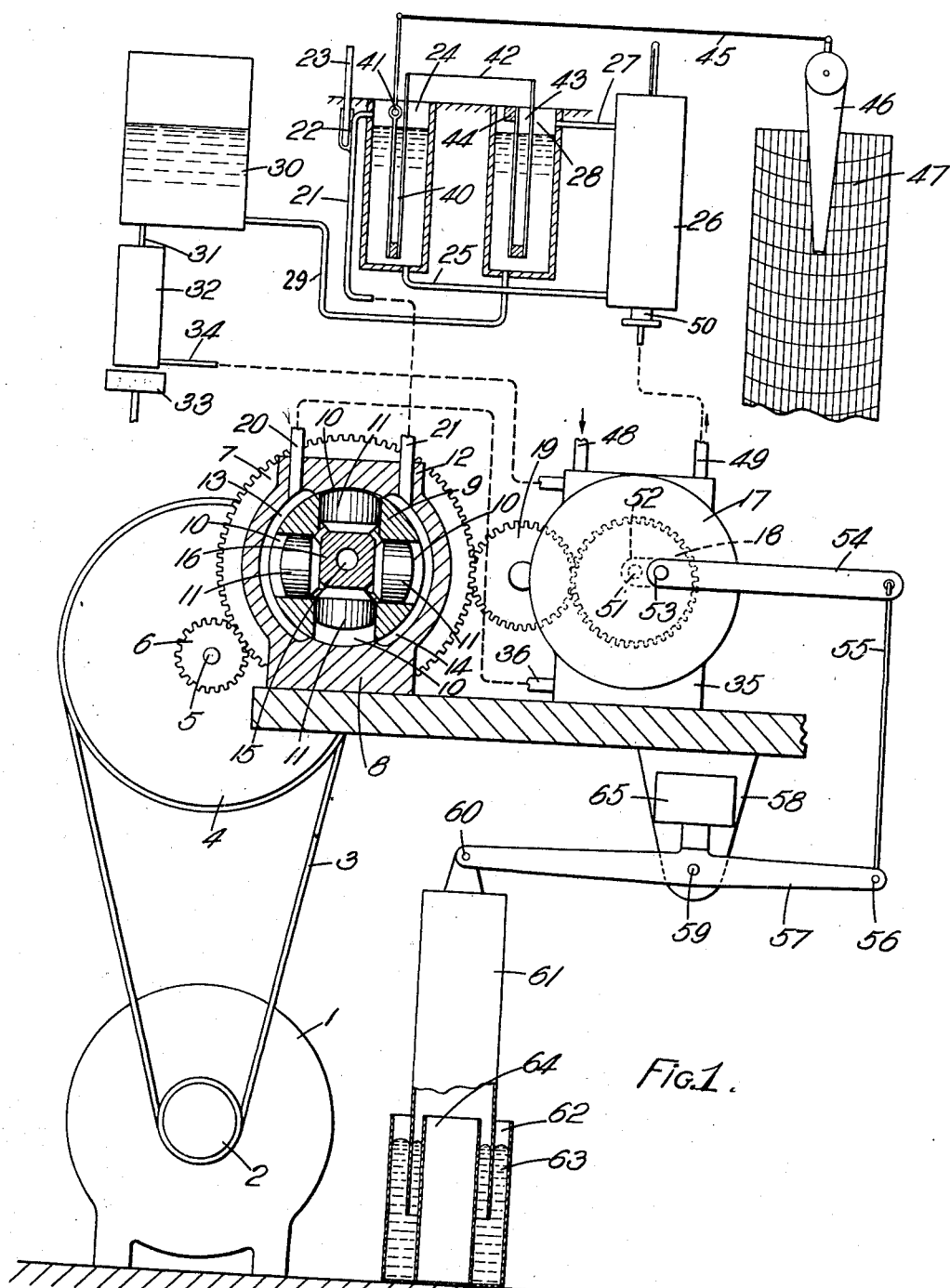

Oct. 24, 1939.　　　　J. G. STEWART　　　　2,177,267
APPARATUS FOR GAS CALORIMETRY
Filed Feb. 8, 1938　　　　2 Sheets-Sheet 1

INVENTOR
JAMES GIBB STEWART
By: Haseltine, Lake & Co.
ATTORNEYS.

Oct. 24, 1939.  J. G. STEWART  2,177,267

APPARATUS FOR GAS CALORIMETRY
Filed Feb. 8, 1938  2 Sheets-Sheet 2

INVENTOR:
JAMES GIBB STEWART
BY: *Haseltine, Lake & Co.*
ATTORNEYS

Patented Oct. 24, 1939

2,177,267

UNITED STATES PATENT OFFICE 2,177,267

APPARATUS FOR GAS CALORIMETRY

James Gibb Stewart, Letchworth, England; Annabella Mitchell Stewart, Hugh McCracken, Jack and Mary Widgery, all executors of said Stewart, deceased Application February 8, 1938, Serial No. 189,416
In Great Britain February 12, 1937

9 Claims. (Cl. 221—96)

This invention relates to apparatus for continuous recording gas calorimetry and is more particularly concerned with that portion of the apparatus responsible for the supply of the gas and the liquid medium usually employed in gas calorimetry for determining temperature rise. In gas calorimeters of the kind to which the invention relates, it is the aim to supply the gas undergoing test to the calorimeter at a particular rate, at standard temperature and pressure, to supply the liquid medium at a known rate, whose relation to the rate of gas supply is constant, and by measurement of the temperature difference in the liquid medium before and after its entry into the calorimeter heat interchanger, to obtain a continuous determination of the calorific value of the gas.

For the successful working of a gas calorimeter the rate of flow of the gas and the liquid medium must, of course, be so adjusted as to take into account the variations in volume of the gas with changes in temperature and pressure. To compensate for changes in local barometric pressure and temperature there may be used the method of diminishing the liquid flow or increasing the actual volumetric flow of gas as the temperature rises or the barometer falls, and vice versa.

In gas calorimeters of the type with which the invention is concerned, it has been the practice to dole out the liquid medium by weighing, or volumetrically by ladling, or by liquid displacement methods. In the weighing mood, surface tension can prevent uniform emptying of the weighing vessel, and in the ladling method surface tension can make the level of the surface of the water in the ladle indefinite. It is one aim of this invention to overcome such errors in water measurement.

In the past the measurement of the gas has been effected by externally driving a liquid sealed drum meter as a pump, or by limiting the rate of the same type of gas meter operated by gas pressure by use of a clock escapement; or by substituting for the driven drum meter a driven set of liquid sealed bells which rise and fall relatively to the liquid seal and which are arranged to pump gas at the required rate. Liquid displacement methods have also been employed. All these methods require liquid seals and it is one feature of the invention that such liquid seals are dispensed with, and errors due to variation in the level of the sealing liquid are eliminated.

Following the principles of the invention, a gas calorimeter has a first piston pump for supplying the gas to be tested at a particular rate and a second piston pump for supplying the liquid employed in the test at a rate which normally bears a fixed relation to said particular rate of gas supply, and there is means acting in association with one of the pumps for controlling the rate of output according to the local barometic pressure and temperature conditions. Other aspects of the invention will become apparent from the claims which follow. It will be understood that the liquid medium employed in the testing will normally be water, but that other liquids, such as oil, might advantageously be used. For the purposes of specific description of apparatus, it will be assumed that water is the liquid in question, but this is not to be taken as a limitative statement.

Figure 2:
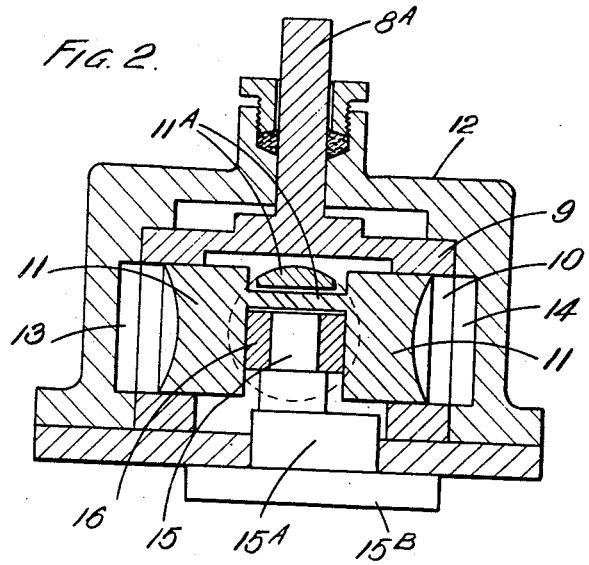
Figure 3:
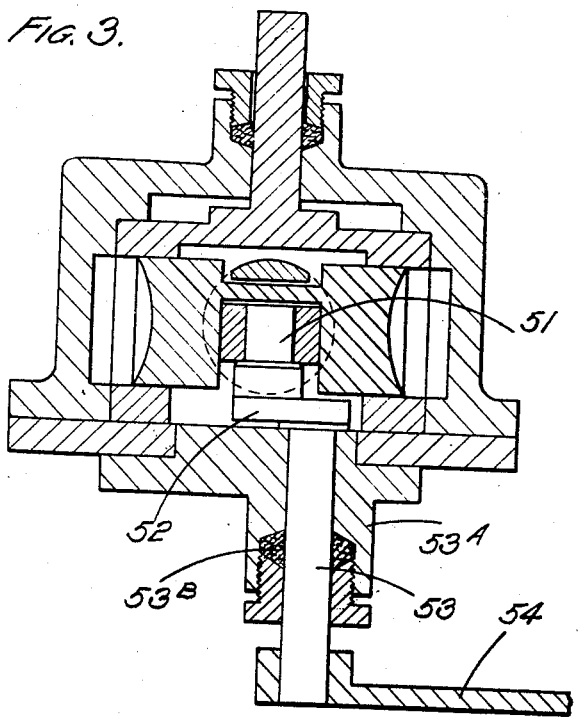

In order that the said invention may be clearly understood and readily carried into effect the same will now be more fully described with reference to the accompanying drawings, in which:

Figure 1 shows partly in section a diagrammatic side view of a gas calorimeter according to the invention and Figures 2 and 3 are sectional plan views of pumps employed in the apparatus of Figure 1.

In Figure 1 of the drawings that portion of the calorimeter apparatus which actually includes the calorimeter and the recording mechanism, is shown to a reduced scale, as compared with the remaining part of the apparatus concerned with the supplying of the gas and water to the calorimeter, the supply apparatus being that with which the invention is essentially concerned.

The supply apparatus is driven from an electric motor 1 having a driving pulley 2 connected by means of a belt 3 with a driven pulley 4. The latter is carried upon a shaft 5 which also carries a gear-wheel 6. The latter meshes with a further gear-wheel 7 secured upon the driving shaft of a multiple piston rotary pump 8. This driving shaft is indicated at 8A in Figure 2 which is a sectional plan of the pump 8. The pump 8 is of the type having a rotating block 9 formed with cylinders 10 for the reception of pistons 11. Each piston 11 is mechanically connected with the one that is diametrically opposite to it so as to afford two pairs of coupled pistons, the couplings being shown at 11A. The body 12 of the pump casing has an inlet chamber 13 and an outlet chamber 14. In the pump there is arranged a crank-pin 15 carried eccentrically upon a boss 15A that fits in an aperture formed in a part of the pump body casing 12, and which has a plate 15B secured to it. The plate 15B may be turned by hand to any desired angular setting, so as to adjust the crank-pin 15 in regard to its eccentricity, to afford a variation in the stroke of the pistons of the pump 8. The crank-pin 15 has secured rotatably on it a block 16 engaging between the pistons of each piston pair.

A pump 17, of the same nature as the pump 8, has a driving pinion 18 meshing with a pinion 19 which in turn engages with the pinion 7 so that the pump 17 is indirectly driven from the motor 1.

The pump 8 is intended for the supply of water to the calorimeter apparatus proper, and has an inlet pipe 20 and an outlet pipe 21. The outlet pipe 21 includes a thermometer pocket 22 housing a thermometer 23, and extends finally to a vessel 24. There is an outlet pipe 25 connected from the bottom of the vessel 24 to the lower end of a heat interchanger unit 26, wherein the gas whose calorific value is to be continuously determined, is burnt to yield up heat to the water introduced into the unit by the pipe 25, all in known manner. There is an outlet pipe 27 from the unit 26 such pipe 27 communicating with the upper end of a second vessel 28 of the same character as the vessel 24. The bottom of the vessel 28 has an outlet pipe 29 communicating with it and extending to a reservoir 30 from whence there is a connecting pipe 31 to a radiator 32. A fan 33 is arranged to cool the radiator 32, and the water which has passed through the radiator emerges through a pipe 34 leading to a vessel 35 in which the body of the pump 17 is immersed. A pipe 36 communicates also with the vessel 35 and with the inlet 20 to the pump 8.

For the purpose of carrying out the continuous recording, the vessel 24 has arranged within it a bi-metallic member 40 which is pivoted at 41. There is a mechanical connecting member 42 extending between one strip of the bi-metallic member 40 and a strip of a second bi-metallic member 43 disposed in the vessel 28. The bi-metallic member 43 is anchored adjustably to a fixed block 44 associated with the vessel 28. The bi-metallic member 40 is connected also by a mechanical transmission element 45 with one end of a recording pen-holder 46 of a mechanical recorder of known construction. Only the recording surface 47 is indicated, but it will be understood that any known form of mechanical recording mechanism is here applicable.

The pump 17 has an inlet and an outlet pipe, 48 and 49 respectively, the pipe 49 communicating with the gas inlet connection 50 of the unit 26. The inlet pipe 48 is connected with an external gas supply conduit (not shown).

The pump 17, as already indicated above, is constructed in the same manner as the pump 8. The pump 17 is shown in sectional plan in Figure 3 and it will be unnecessary to describe all the working parts thereof since they are mainly the same as those described above with reference to Figure 2. The pump 17 has, however, an additional device for automatically regulating the eccentricity of its crank-pin 51. For this purpose the position of the crank-pin 51 is controlled by a short lever 52, located within the pump casing and mounted upon a live pivot 53 which extends to a point outside the casing of the pump 17 and which has secured to it one end of an arm 54. The pivot 53 is carried in a sleeve 53A which is provided with a gland 53B secured removably in the pump body casing. The end of the arm 54 that is more distant from the pin 53 is connected to a rod 55, which is in turn connected to the end 56 of a centrally fulcrumed lever 57, the latter being pivoted between the cheeks of a fixed yoke 58, at 59. At the end of the lever 57 that is remote from its pivotal connection 56, there is a further pivotal connection 60 to the upper end of a cylindrical bell 61. The upper end of the latter is closed but at its lower end it is left open and enters a vessel 62 containing mercury, as at 63. The vessel 62 has an upstanding cylindrical portion 64 to the interior of which no mercury is admitted. The mercury therefore rises between the interior cylindrical wall of the bell 61 and the external cylindrical wall of the member 64. Just above its pivot point 59, the lever 57 carries a weight 65.

When the apparatus is in operation the motor 1 is supplied with electric current from any convenient current source and drives the pinion 6 through the intermediary of the pulleys 2 and 4 and the belt 3. The pinion 6 rotates the meshing pinion 7 which in turn actuates the pinion 19 meshing with the pinion 18. In this way the pumps 8 and 17 are both driven from a common source of power, their relative speeds of actuation depending upon the gear ratio of the intermediate transmission. The stroke of the pistons 11 of the pump 8 relative to their respective cylinders 10 will be determined by the eccentric offset of the crank-pin 15. In adjusting the apparatus therefore the crank-pin 15 is brought to a definite position depending upon the desired rate of output from the pump. By the relative motion of the pistons and cylinders, water is drawn into the intake pipe 20 and pumped out through the outlet pipe 21 whence it enters the vessel 24. Prior to entry into such vessel the temperature of the water may be observed from the thermometer 23.

The temperature of the water within the vessel 24 will be measured by the deformation produced on the bi-metallic member 40. The water leaves the vessel 24 and enters the heat interchanger unit 26 where the gas undergoing test is being burnt. The temperature of the water is raised during passage through the interchanger unit and the water emerges into the vessel 28, the temperature of the water again being indicated by the deformation of the second bi-metallic member 43. The connection of the bi-metallic members 40 and 43 results in that their joint indication, as expressed by movement of the mechanical transmission member 45, represents a differential measure of the temperature as between the water contained in the vessel 24 and in the vessel 28. The differential temperature recording is reproduced upon the recording sheet 47.

The pump 17 from its outlet pipe 49 supplies the gas to the heat interchanger 26. The rate of output of gas is determined by the eccentricity of the crank-pin 51 and in this case such eccentricity is determined by the atmospheric conditions prevailing in the region of the apparatus. As will be understood the air within the bell 61 and the member 64 will change in volume and density depending upon the local barometric pressure and the local temperature. When the bell 61 rises the equivalent crank radius of the pump 17 will increase by a directly proportionate amount, and similarly when the bell 61 sinks the crank radius of the pump 17 will diminish proportionately. The weight 65 introduced in the mechanical system will have the effect of assisting in any adjusting movement of the bell 61, and may be so adjusted as to produce conditions of equilibrium of the bell 61 where the pressure of the air in the latter is substantially the same as the local atmospheric pressure.

As will be understood, the mechanical differential recording system described above may be replaced by other known recording systems. There is, for example, the known electrical recording system.

The pressure of the gas supply to the pump 17 is kept low, for example in the region of about ⅝ inch water gauge, and the alterations in the stroke of the pump as produced by the actuation of the lever 54 are made just sufficient to counteract the effects of local changes of temperature and barometric pressure upon the readings recorded upon the continuous recording apparatus. The vessel 35 through which the return water is passed, serves to keep the pump 17 at substantially the local atmospheric temperature, whereby the effects of any frictional heat produced by the pump on the gas will be minimized.

What I claim and desire to secure by Letters Patent of the United States is:

1. In apparatus for gas calorimetry, means for supplying to the calorimeter apparatus the gas that is to be tested and the liquid medium employed for determining the calorific value, comprising a first piston pump for producing a particular rate of supply of said liquid medium, a second piston pump for producing a rate of supply of the gas, which rate normally bears a fixed relation to the said rate of liquid medium supply, and means effective upon one of said pumps for varying the output flow therefrom to compensate for local changes in atmospheric temperature and pressure.

2. In apparatus for gas calorimetry, means for supplying to the calorimeter apparatus the gas that is to be tested and the liquid medium employed for determining the calorific value, comprising a first piston pump for producing a particular rate of supply of said liquid medium, a second piston pump for normally producing a rate of supply of the gas which rate normally bears a fixed relation to the said rate of liquid medium supply, and means effective upon said second piston pump for varying the output flow therefrom to compensate for local changes in atmospheric temperature and pressure.

3. In apparatus for gas calorimetry, means for supplying to the calorimeter apparatus the gas that is to be tested and the liquid medium employed for determining the calorific value, comprising a first piston pump for producing a particular rate of supply of said liquid medium, a second pump formed as a rotary multiple piston pump, the stroke of whose pistons may be varied, and means for adjusting such stroke in accordance with the local atmospheric pressure and temperature.

4. In apparatus for gas calorimetry, means for supplying to the calorimeter apparatus the gas that is to be tested and the liquid medium employed for determining the calorific value, comprising a first piston pump for producing a particular rate of supply of said liquid medium, a second piston pump for normally producing a rate of supply of the gas, which rate normally bears a fixed relation to the said rate of liquid medium supply, a movable bell member containing gas and sealed at its open end by a body of liquid which is otherwise open to the atmosphere, a control element upon said second pump, said control element by its movement adjusting the rate of output of said second pump, connecting means arranged between said bell member and control element to produce movement of the control element according to the movements experienced by the bell member as a result of volume changes, brought about by local atmospheric conditions, in the gas within said bell member.

5. In apparatus for gas calorimetry, means for supplying to the calorimeter apparatus the gas that is to be tested and the liquid medium employed for determining the calorific value, comprising a first piston pump for producing a particular rate of supply of said liquid medium, a second pump for producing a rate of supply of the gas, which rate normally bears a fixed relation to the said rate of liquid medium supply, a bell member suspended with its mouth sealed by a body of liquid which is otherwise exposed to the atmosphere, means for counterbalancing the bell member to assure that the gas contained therein is substantially at the local barometric pressure, a control element upon said second pump for varying the rate of output therefrom and a mechanical connection between said control member and said bell member to allow the control member to be moved according to the movement of the bell member.

6. In apparatus for gas calorimetry, means for supplying to the calorimeter apparatus the gas that is to be tested and the liquid medium employed for determining the calorific value, comprising a first piston pump for producing a particular rate of supply of said liquid medium, a second pump which is formed as a rotary multiple piston pump and which produces a rate of supply of gas bearing a normally fixed relation to the rate of liquid supply, a crank member whose eccentricity with respect to the pump may be varied to produce a greater or lesser stroke of said pump, a control element for displacing the crank member, a bell whose open end is allowed to depend into a body of liquid which is otherwise open to the atmosphere, and a mechanical connection between the bell and said control elements to influence the position of the control elements according to the position assumed by the bell due to the gas which is contained therein and which changes in volume according to the local temperature and pressure.

7. In apparatus for gas calorimetry, means for supplying to the calorimeter apparatus the gas that is to be tested and the liquid medium employed for determining the calorific value, comprising a first rotary multiple piston pump having an adjustable crank member to determine the throw of the pistons, a source of motive power for driving said first pump, mechanical transmission between said first pump and a second pump also formed as a multiple piston rotary pump, a second crank member associated with said second pump, said second crank member being adjustable to vary the throw of the pistons thereof, a control element arranged to displace said second crank member upon movement of the control element, a vertically movable bell arranged to depend with its open end over a body of liquid which is otherwise open to the atmosphere, a counterbalance system for supporting said bell to assure that gas trapped therein shall be at substantially atmospheric pressure, a mechanical connection between the bell and the control element, so that the position of the latter is determined by the position of the bell.

8. In apparatus for gas calorimetry, means for supplying to the calorimeter apparatus the gas that is to be tested and the liquid medium employed for determining the calorific value, comprising a first piston pump for producing a particular rate of supply of said liquid medium, a second pump for producing a rate of supply of the gas, which rate normally bears a fixed relation to the said rate of liquid medium supply, means effective upon said second pump for varying the output flow therefrom to compensate for local changes in atmospheric temperature and pressure, and a container for enclosing said second pump and for the reception of liquid which is at substantially the local atmospheric temperature and which is drawn through said container to the inlet of said first pump.

9. In apparatus for gas calorimetry, means for supplying to the calorimeter apparatus the gas that is to be tested and the liquid medium employed for determining the calorific value, comprising a first piston pump for the liquid medium supply, a second piston pump for the gas supply, a source of power for driving the pumps, mechanical transmission from said power source to both said pumps, so that the latter are driven in a fixed ratio as regards speed, and means effective upon one of said pumps for varying the output flow therefrom to compensate for local changes in atmospheric temperature and pressure.

JAMES GIBB STEWART.